June 26, 1956 K. F. ROSS 2,752,421

SCANNING METHOD AND TELEVISION SYSTEM USING SAME

Filed March 11, 1952 6 Sheets-Sheet 1

INVENTOR:
Karl F. Ross

June 26, 1956 K. F. ROSS 2,752,421

SCANNING METHOD AND TELEVISION SYSTEM USING SAME

Filed March 11, 1952 6 Sheets-Sheet 2

INVENTOR:

Karl F. Ross

June 26, 1956 K. F. ROSS 2,752,421

SCANNING METHOD AND TELEVISION SYSTEM USING SAME

Filed March 11, 1952 6 Sheets-Sheet 3

INVENTOR:

Karl F. Ross

SCANNING METHOD AND TELEVISION SYSTEM USING SAME

Filed March 11, 1952 6 Sheets-Sheet 4

INVENTOR:
Karl F. Ross

INVENTOR:

Karl F. Ross

June 26, 1956 K. F. ROSS 2,752,421

SCANNING METHOD AND TELEVISION SYSTEM USING SAME

Filed March 11, 1952 6 Sheets-Sheet 6

INVENTOR:

Karl F. Ross 2,752,421
Patented June 26, 1956

2,752,421

SCANNING METHOD AND TELEVISION SYSTEM USING SAME

Karl F. Ross, Bronx, N. Y.

Application March 11, 1952, Serial No. 275,953

20 Claims. (Cl. 178—6.8)

My present invention relates to television system and has for its general object the provision of a method of and means for so transmitting and receiving television signals as to enable reconstruction of an image with the aid of signals whose information content is considerably reduced in comparison with conventional television signal, whereby transmission may take place over waves of relatively low frequency.

The ordinary black-and-white picture to be televised is normally scanned at a rate of about 500 lines to the frame, with a minimum of sixteen frames per second. With a horizontal division equal to the vertical one, i. e. with about 500 elements per line, intelligence signals must be transmitted at a rate of at least 4,000,000 per second, corresponding to a band width of four megacycles; this band width is doubled or tripled for color television. The need for channel spacing necessitates the use of carriers ranging from the tens to the hundreds of megacycles. Shadowing, "ghosts" due to reflecting objects, and the need for closely spaced relay stations for long-distance transmission are among the well-known disadvantages of operating within this frequency range.

Attempts at reducing the band width have been made in the past by expanding the time base of rapidly varying image portions and contracting the time base of slowly varying ones. Even if it should be possible to avoid appreciable distortion in carrying out this method, it would still be necessary to transmit a band of signal frequencies centered on substantially the mid-frequency of the unmodified band, thus on a frequency of about two megacycles or higher. It will thus be understood that this solution affords, at best, only a relatively minor reduction in the carrier frequencies required.

In accordance with the present invention it is proposed to replace the conventional point-for-point scanning by a novel type of scanning which registers only those points at which an appreciable variation in the light intensity of the picture occurs, and which evaluates both the occurring change and the location of the transition point. Upon analysis of the average television picture it will be found that there generally are quite a few lines present which contain no transition points at all (e. g. sky, walls and other background) while the number of lines with, say, twenty or more transition points is comparatively small. Thus the information content of an entire frame may be represented, at least in a large number of cases, by transmitting an average number of about 5,000 picture elements (corresponding to a mean of ten transition points per line) together with a like number of line scan elements and a like number of frame scan elements for pinpointing the location of each transition point; alternatively, as will be shown in detail hereinafter, the need for transmitting the frame scan elements may be obviated by transmitting a positive indication of each line flyback and of the frame flyback together with the picture and line scan elements.

In order to utilize to the fullest the reduction in the number of signal elements transmitted in a system as outlined above, it is desirable to provide means for uniformly spacing the image and scan elements transmitted, regardless of the actual spacing of the transition points on the televised picture. If this is done, then the maximum frequency in the signal band can be reduced to, say, from 10,000 to 15,000 cycles per frame, or about one-twentieth of the frequency required in point-for-point scanning. Moreover, since the number of signal elements transmitted varies directly with the number of contrasts registered by the scanning device, the signaling frequency and thereby the band width can be further reduced, at the expense of losing some details, by decreasing the sensitivity of the scanner.

According to a feature of this invention, therefore, an image or other type of message is linearly scanned at a rate which is high compared with the rate that would be required for a scanning at uniform speed. Whenever a significant change in the intensity of the message content is encountered, the scan is interrupted and a record is made of the aforesaid intensity adjacent the point of change as well as of the location of said change. At the end of a predetermined interval, which should be of the order of the time allotted for the scanning of the entire message divided by the number of anticipated interruptions, scanning is resumed at the same rate as before.

According to a more specific feature of my invention, the aforementioned operations are carried out automatically by a television transmitter associated with a receiver, the latter including means for reconstructing the original image from two sets of signals representing the locations of the points of change and the image intensity at such points.

This expedient of varying the scanning sensitivity may also be utilized, in accordance with a further feature of the invention, for preventing the frame scanning time from substantially exceeding a predetermined period where an unusual multiplicity of contrasts in the path of the scanning beam would otherwise increase the time of transmission. The scanning sensitivity may be controlled either manually or by automatic means. Similarly, means may be provided to prevent the start of a new frame before the end of a predetermined frame scanning period.

It is also an object of this invention to provide means for adapting an ordinary television receiver for the reception of signals as herein described and for the translation of such signals into signals that can actuate the conventional picture tube, without interfering with the construction of said tube and without greatly altering the circuits normally associated therewith.

The above and other objects and features of the invention will become apparent from the following description, reference being had to the accompanying drawing in which.

The principles of the invention will first be described with reference to the graphs of Figs. 1–5.

Figure 1:
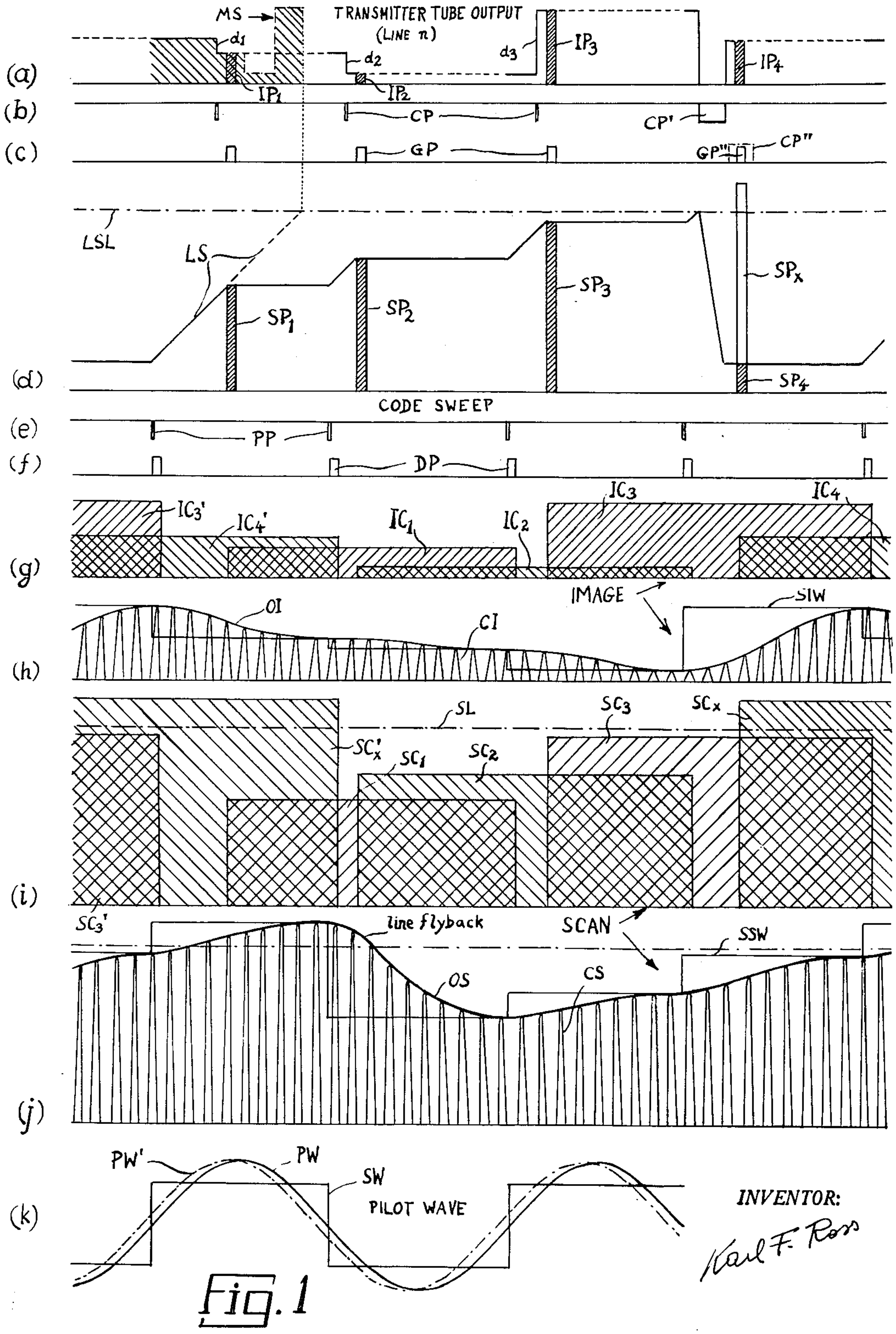
Fig. 1 is a set of graphs illustrating the coding of a television signal, i. e. its translation into image signals and scan signals in accordance with the principles of this invention.

Referring particularly to Fig. 1, there is shown in graph (*a*) a simple television message signal MS (hatched area) as it would appear in the output of a conventional pick-up tube upon the scanning of a particular line (assumed to be the $n^{th}$ line of a frame) at a sweep rate indicated by the partly dotted line LS in graph (*d*). It should be noted that, for reasons that will become apparent hereinafter, the line sweep LS has a contracted time base with respect to the line sweep normally employed in known systems; thus, with 500 lines per frame and, say, 20 frames per second the forward stroke of the line sweep normally has a duration of the order of 100 microseconds, whereas the duration of the sweep LS has here been assumed to be less than one-fifteenth of this value, or about 6 microseconds. A slightly larger interval is marked by pulses PP, graph (*e*), derived from a pilot wave PW, graph (*k*), having a frequency of 75,000 cycles per second.

From graphs (*d*) and (*e*) it will be noted that the line sweep LS is initiated by one of the pilot pulses PP. Dot-dash line LSL, graph (*d*), indicates the sweep limit the reaching of which produces the flyback stroke. The line sweep, however, is governed not only by the pilot pulses PP but also by a train of control pulses CP, graph (*b*), derived from the pick-up tube as the result of this very sweep. These control pulses are generated by differentiation of the tube output shown in graph (*a*), this output being at first identical with the message signal MS to be transmitted. When the first discontinuity in the signal, here represented by a drop in luminous intensity, is encountered at $d_1$, a negative control pulse CP is produced which, after being dleayed, inverted and reshaped, appears as a positive gating pulse GP, graph (*c*). The delayed control pulse also causes the line sweep LS to be arrested an instant after the occurrence of the discontinuity, thereby maintaining the tube output at a fixed value indicated by the dotted horizontal line in graph (*a*). Gating pulse GP causes the magnitude of the instantaneous value of the signal output of the tube to be registered in the form of an image pulse $IP_1$ and also causes the magnitude of the arrested sweep potential to be similarly registered in the form of a scanning pulse $SP_1$.

The arrested condition of the pick-up tube continues until the next pilot pulse PP is generated, whereupon the sweep is restarted. When the next discontinuity or contrast $d_2$ is encountered, another control pulse CP and gating pulse GP are generated, resulting in the production of image pulse $IP_2$ and scanning pulse $SP_2$. In like manner an image pulse $IP_3$ and a scaning pulse $SP_3$ are produced to register the image intensity and the sweep level immediately after the discontinuity $d_3$.

When the line sweep finally reaches its limiting value LSL, an auxiliary control pulse CP′ is generated which suppresses the pick-up tube output for the duration of the flyback stroke, thereby preventing the generation of spurious control pulses, and also results in an auxiliary gating pulse GP″. The latter pulse, occurring at the beginning of the new line $n+1$ (which for the sake of simplicity is assumed to be identical with the preceding line $n$), gives rise to an image pulse $IP_4$ indicating the image intensity at the beginning of said new line, as well as to a scaning pulse $SP_4$ of small magnitude since the sweep potential is now at its minimum. In order, however, to give a more positive indication of the line flyback there is also produced, as shown in graph (*c*) an inverted (positive) and delayed replica CP″ of the auxiliary control pulse CP′, this inverted pulse serving to increase the amplitude of scanning pulse $SP_4$ to a value well in excess of that corresponding to the sweep limit LSL, as indicated at $SP_x$.

Thus the signal MS has been fully coded with the aid of four image pulses $IP_1$–$IP_4$ and four scanning pulses $SP_1$, $SP_2$, $SP_3$, $SP_x$, the last scanning pulse $SP_x$ by its high amplitude indicating the end of the old scanning line and the beginning of a new one. It will be seen that these pulses are spaced from one another, on the average, by an interval equal to half a period of the pilot wave PW, or about 1/150 millisecond, but that the actual pulse spacing is subject to variation within wide limits. For a full utilization of the advantages afforded through the invention it thus becomes desirable, as illustrated in graphs (*f*) through (*j*), to equalize the spacing of these pulses whereby it becomes possible to transmit their amplitudes with the aid of two signal waves having a total band width not exceeding substantially four times the frequency of the pilot wave.

For this puropse the pilot wave PW is transformed into a square wave SW, graph (*k*), which alternately conditions a first pair of storage circuits to receive respective image pulses IP and also alternately conditions a second pair of storage circuits to receive respective scanning pulses SP. While either storage circuit of a pair is operative, the other is discharged under the control of discharge pulses DP, graph (*f*), to prepare it for the reception of the next pulse of the corresponding train. The discharge pulses DP occur at regular intervals and are derived from the pilot pulses PP by inversion, broadening and delay. The diagonally hatched pulses IC in graph (*g*) denote the charges due to the image pulses IP stored at any time in the first pair of storage circuits, while similar pulses SC in graph (*i*) denote the charges due to the scanning pulses SP stored in the second pair of storage circuits; the two circuits of each pair are distinguished by opposite hatching. Thus it will be seen from graph (*g*) that prior to the arrival of the first pilot pulse PP the two image storage circuits carry charges $IC_3'$, $IC_4'$, respectively, the magnitudes of these charges corresponding, respectively, to the amplitudes of pulses $IP_3$ and $IP_4$. This is true because it has been assumed that the three consecutive lines $n-1$, $n$ and $n+1$ are alike, so that the end of line $n-1$ corresponds to that of line $n$ (represented by pulse $IP_3$) whereas the beginning of line $n$ corresponds to the beginning of line $n+1$ (represented by pulse $IP_4$). The first discharge pulse DP clears the first storage circuit, by removing therefrom the charge $IC_3'$, but does not affect the charge $IC_4'$ on the second circuit. Since the delay between pulses CP and GP is shown greater than that between pulses PP and DP, a new gating pulse can occur only after the storage circuit designed to register the next image pulse has been fully discharged. When this gating pulse is produced, a charge corresponding in magnitude to pulse $IP_1$ is stored on the free circuit as shown at $IC_1$. The next discharge pulse DP clears the second storage circuit to prepare it for the reception of a charge $IC_2$, corresponding to image pulse $IP_2$. Subsequent charges $IC_3$ and $IC_4$ are thereafter stored on the two circuits in like manner.

Charges $SC_3'$, $SC_x'$, $SC_1$, $SC_2$, $SC_3$ and $SC_x$, corresponding to respective ones of the scanning pulses $SP_1$, $SP_2$, $SP_3$ and $SP_x$ are similarly received on the second pair of storage circuits as shown in graph (*i*).

Under the control of switching wave SW, graph (*k*), portions of unit length (the unit here being equal to half a period of pilot wave PW) of the stored charges shown in graph (*g*) are combined to form a stepped wave SIW, graph (*h*), while similar portions of the stored charges shown in graph (*i*) are combined to form a stepped wave SSW, graph (*j*). Passing each of these waves through a low-pass filter to cut off the higher harmonics results in well-rounded oscillations OI, OS, respectively, shown in graphs (*h*) and (*j*) as the envelopes of respective carrier waves CI, CS of which only the positive half-cycles have been illustrated.

It will be noted that the amplitude of the modulated carrier CI or CS is exactly equal to that of one of the pulses IP or SP, respectively, at about the instant when the pilot wave PW goes through zero. Because, however, the presence of residual higher harmonics may introduce some distortion at the points where the original stepped wave SIW or SSW has a discontinuity, a more dependable reading may be obtained by sampling the modulated carrier wave just ahead of the zero points of wave PW. For this purpose a wave PW′ leading the wave PW by a small phase angle, as shown in graph (*k*), may be transmitted along with the modulated carriers CI and CS.

It will have become apparent from the foregoing description that the original signal MS, which at the sweep rate employed could have been scanned in approximately six microseconds in the absence of interruptions, has been prolonged by the intermitent sweep shown in graph (*d*) to occupy an interval equal to as many units of time (i. e. half-cycles of the pilot wave PW) as there are discontinuities in the signal, there being three such discontinuities $d_1$, $d_2$, $d_3$ plus a fourth, represented by the line flyback, in the case specifically illustrated. With an assumed average of nine contrasts per line, or 5,000 discontinuities per frame (including the 500 line flybacks), the time required for scanning a complete frame in this manner would be 2,500 cycles of the 75,000-C. P. S. pilot wave or one-thirtieth of a second. Thus the frame scanning would consume about 33 milliseconds, or two-thirds of the 50-ms. interval required for scanning at a rate of twenty frames per second.

At the same time the combined information content of the two envelopes OI and OS is only 10,000 elements per 33-millisecond interval, as against about 175,000 for a like interval in the output signal of a conventional television camera. Since the pilot wave PW′ is of constant frequency, its contribution to the required band width will be negligible. It will thus be seen that for the transmission of pictures having between 4,000 and 5,000 contrasts (distributed over 500 lines) the band width required in a system according to the present invention is hardly more than one-twentieth of that needed in the usual systems.

It should be particularly noted that the envelopes OI and OS, owing to the elimination of harmonics, are composed substantially of sine wave sections each extending from one step of the corresponding stepped wave SIW, SSW to the next. It will be observed that the frequency of these wave sections is equal to that of the pilot wave PW, so that a band width substantially not exceeding 150,000 C. P. S. should suffice for transmitting either of the modulated carriers CI, CS, It may be mentioned that a more positive suppression of undesired harmonics in the envelopes of these carriers without loss of signal may be accomplished, instead of by the simple use of low-pass filters as set forth above, through the expedient of synthesizing a modulating wave from separately modulated sine wave sections and then amplitude-modulating the carrier with said wave. This modulating wave may be synthesized, for example, from the outputs of two modulators to which a sinusoidal oscillation having the frequency of pilot wave PW is applied with a 180° phase difference, the peaks of this oscillation coinciding with the steps of waves SIW, SSW (hence with the pulses PP). By applying alternate steps of, say, the wave SIW to the two modulators, respectively, and doubling (through storage) the length of each step so that alternate steps will overlap during unit-length periods, two modulated outputs will be obtained which, if differentially combined and superimposed upon the stepped wave SIW, will result in a wave composed of sine wave sections similar to those of wave OI but separated by vertical steps; these steps may be readily removed by low-pass filtering, resulting in the desired modulating wave having the configuration of envelope OI.

Figure 2:
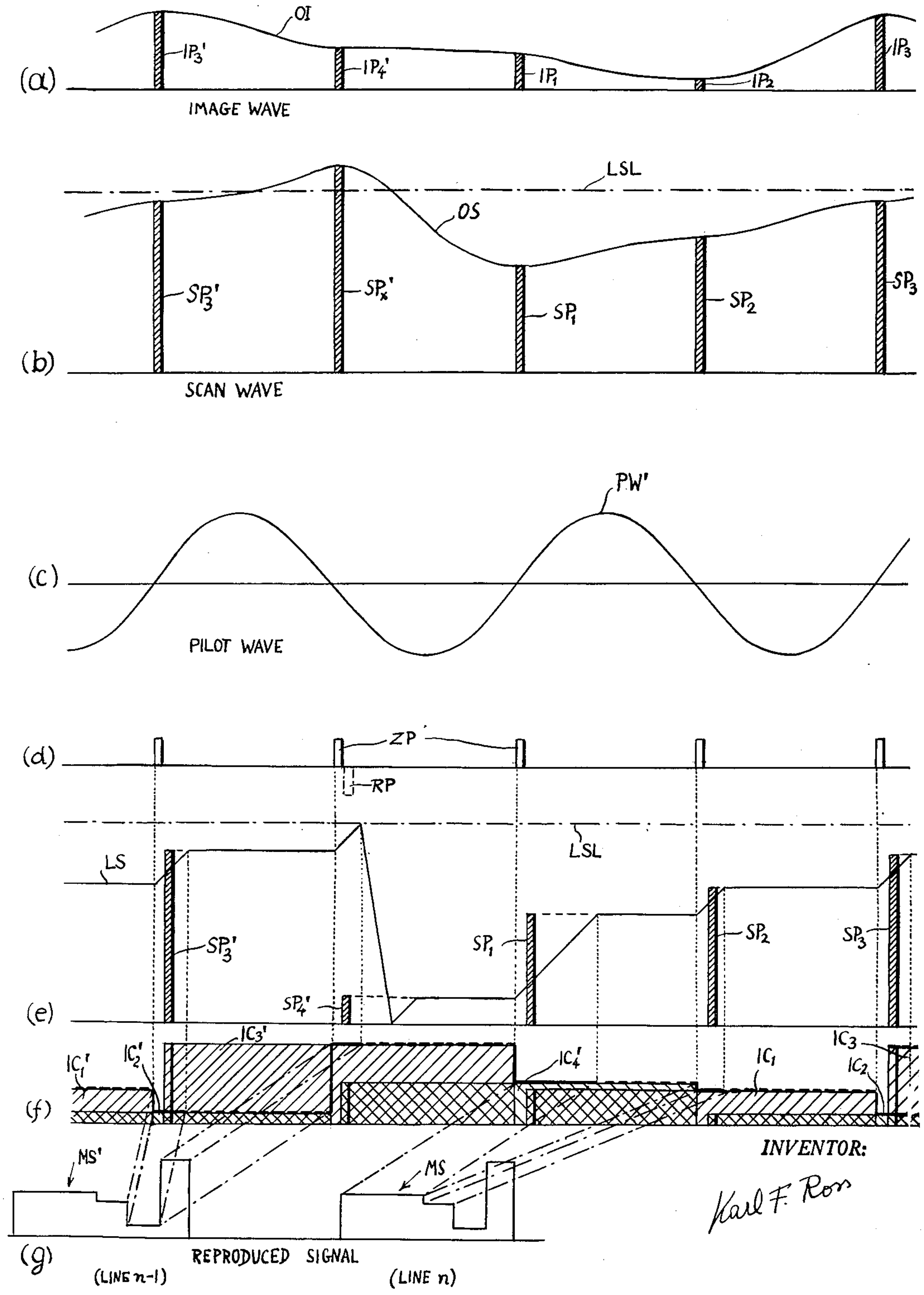
Fig. 2 is a set of graphs illustrating the decoding of the received signals to reproduce the original television signal.

Reference is now made to Fig. 2 for an understanding of the decoding process taking place at the receiver. Upon demodulation of the incoming carrier waves there are reproduced at the receiver the image oscillation OI, the scanning oscillation OS and the dephased pilot wave PW′, as shown in graphs (*a*), (*b*) and (*c*), respectively. From the latter wave there are derived a train of zero-signal pulses ZP, graph (*d*), which determine the instants at which the waves OI and OS should be sampled to reproduce the pulses $IP_3'$, $IP_4'$, $IP_1$, $IP_2$, $IP_3$ and $SP_3'$, $SP_x'$, $SP_1$, $SP_2$, $SP_3$ corresponding to similarly designated pulses of Fig. 1.

In graph (*e*) the pulses of graph (*b*) appear in slightly delayed position. Also, the pulse $SP_x'$ in exceeding the sweep limit LSL has given rise to a scan reducing pulse RP, graph (*d*), which has an effect opposite to that of pulse CP″ in graph (*c*) of Fig. 1; pulse RP causes a reduction in the amplitude of the delayed pulse corresponding to pulse $SP_x'$ so as to produce a pulse $SP_4'$ having the same minimum amplitude as pulse $SP_4$ shown in graph (*d*) of Fig. 1.

The image pulses of graph (*a*), Fig. 2, are now stored in a manner similar to that described in connection with graph (*g*), Fig. 1, thereby producing the charges $IC_1'$—$IC_4$ and $IC_1$, $IC_2$ shown in graph (*f*) of Fig. 2. The line sweep LS, graph (*e*), is initiated by each pulse ZP and is arrested as soon as the sweep reaches a level corresponding to that of the delayed pulse SP received in the interim, said pulse being likewise stored in suitable manner for this purpose. The beam of a receiving tube, displaced in accordance with this intermittent sweep (which is exactly similar to that shown in graph (*d*) of Fig. 1), is intensity-controlled in accordance with the stored charges IC and is suppressed whenever the sweep is arrested, as indicated by the dotted horizontal lines of graph (*f*), thereby converting the time signal of graph (*f*) into the space signal of graph (*g*) representing a reconstruction of the message signal MS of line *n* and of the identical message signal MS′ of the preceding line $n-1$. From the dot-dash lines interconnecting graphs (*f*) and (*g*) the relationship between the time signal and the space signal may be readily ascertained. It will also be observed that the appearance of signal MS at the receiver lags behind its scanning at the transmitter by a few cycles of the pilot wave PW.

By way of modifying the method just described it is also possible to arrive at the reconstructed signal MS by first registering a space signal in the form of spaced pulses $IP_1$—$IP_4$, the uniform time position of these pulses as shown in graph (*a*), Fig. 2, being replaced by spatial distances corresponding to the amplitudes of the respective scanning pulses SP. Reading of the pulse pattern at uniform scanning speed, coupled with the storage of each pulse amplitude until the next pulse is encountered, will likewise result in the television signal shown in graph (*g*) which in turn may be utilized to actuate a conventional television picture tube. Means for carrying out the decoding process in either of these forms will be described hereinafter in connection with Figs. 7 and 8.

Decoding of the received pulses to produce a space signal and, where necessary, translation of the latter into the final time signal adapted to be reproduced by the conventional receiving tube may take place either concurrently or consecutively. Concurrent decoding and translation may proceed, conveniently, on a line-for-line basis, each line being reproduced on the viewing device shortly after its decoding has been completed. The other possibility envisaged is to decode a number of lines in succession, preferably an entire frame, and to reproduce them in their totality during a period of rest during which no code pulses are received. The latter procedure is illustrated in Fig. 3.

Figure 3:
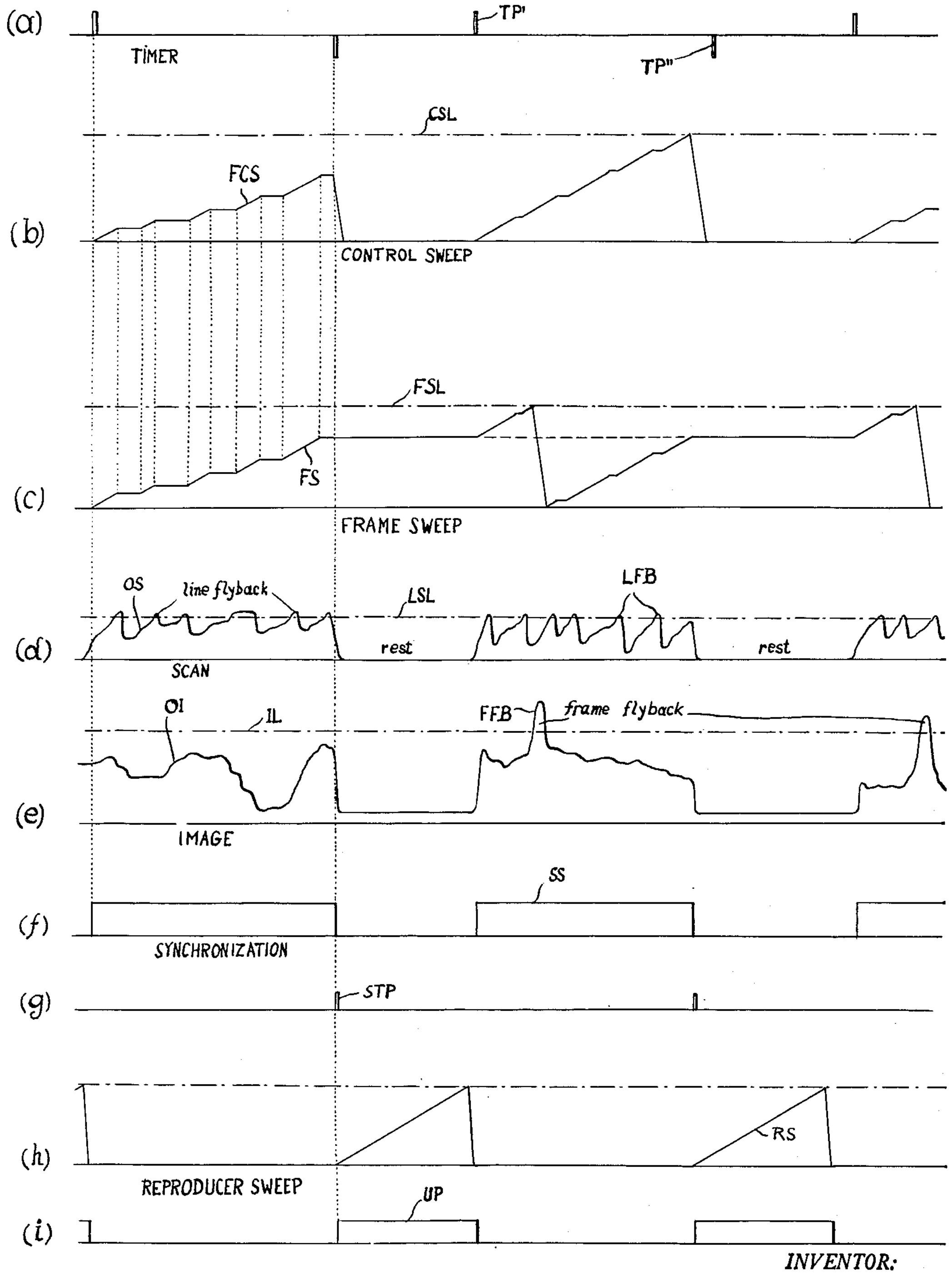
Fig. 3 is a set of graphs illustrating the line and frame scan synchronization between the transmitter and the receiver.

Graph (*a*), Fig. 3, illustrates the output of a timer producing a succession of positive pulses TP′ alternating with negative pulses TP″. The spacing between two positive pulses represents a frame period and has been assumed to have a duration of 50 milliseconds, for twenty frames per second. This period is subdivided by the negative pulse into a transmission period, of about 33 milliseconds' duration, and a subsequent rest period reserved for the reproduction of the decoded image.

The frame scan FS, graph (*c*), is interrupted concurrently with each interruption of the line scan LS, graph (*d*) in Fig. 1, hence the time required for the completion of the sweep will depend on the number of contrasts encountered by the scanning beam. The scanning rate is so selected that the frame scanning limit FSL is reached within the transmission period of 33 ms. whenever the number of interruptions does not exceed a predetermined maximum, e. g. 5,000 (including the 500 line flybacks) in the example assumed. If the presence of a large number of details prevents the completion of the sweep within that period, frame scanning is interrupted by the arrival of the negative timer pulse TP″. It is also desirable, however, to prevent the starting of a new frame if lack of contrasts shortens the scanning period to less than the 33 ms. interval, since this would means the storage of overlapping image portions at the receiver with resulting distortion of the picture. In this connection it should be understood that the frame need not be terminated at the geometrical end of the picture (e. g. at the bottom), but that any cyclic succession of, for example, five hundred lines beginning with any line whatsoever constitutes a complete frame.

In graph (*b*) of Fig. 3 there is shown a frame control sweep FCS which is interrupted and restarted in step with the frame scan FS, graph (*c*), and is returned to its starting point either by the arrival of a negative timer pulse TP″, as shown at the left, or by attainment of its sweep limit CSL, as shown on the right. In the latter case the flyback of the control sweep FCS arrests the frame sweep FS until the control sweep is restarted by the next positive timer pulse TP′. It will thus be observed that the control sweep FCS starts at zero at the beginning of each frame period whereas the frame sweep FS, as shown in graph (*c*), is restarted at the same time at the level on which it had been arrested previously. To indicate the geometrical end of the picture, a frame flyback signal FFB, graph (*e*), is transmitted whenever the frame sweep goes through zero, this signal being conveniently in the form of an image pulse (or a succession of image pulses) of abnormally high amplitude (i. e. exceeding the image limit IL).

The envelopes OS and OI of the modulated carrier waves CS and CI are shown in graphs (*d*) and (*e*), respectively, for a period extending slightly beyond two frames. The several line flyback pulses LFB are representative of about 500 such pulses occurring during each interval between two frame flyback pulses FFB. From graph (*d*) it will be noted that the line scan is suppressed during each rest period, which is the period initiated by a negative timer pulse TP″ and terminated by a positive timer pulse TP′, thereby giving a synchronizing signal to the receiver which is recovered in the form of a wave SS, graph (*f*). From this wave there are derived a train of starting pulses STP, graph (*g*), which are in step with the pulses TP″ of graph (*a*) and serve to initiate the sweep RS of the reproducing device, graph (*h*); these starting pulses also give rise to an unblocking pulse UP, graph (*i*), coincident with each reproducer sweep. Sweep RS comprises a frame scan which returns to zero at the end of each rest period, accompanied by a suitably stepped-up line scan (not shown). During this period the space signals previously recorded by the decoder are translated into a viewable picture and are simultaneously erased to make room for further registrations.

Figure 4:
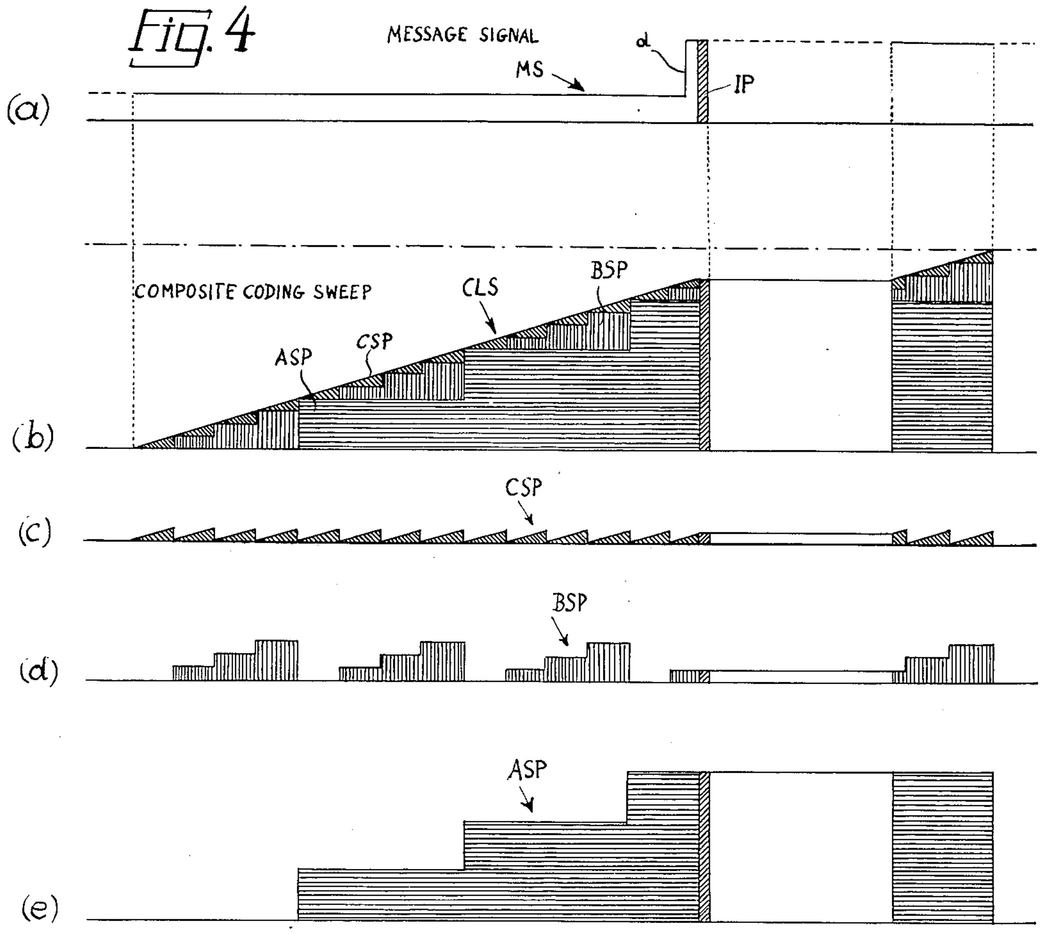
Fig. 4 is a set of graphs illustrating a modified form of line sweep.

Fig. 4 illustrates a composite type of sweep which may be substituted for the line sweep shown in the preceding figures. Graph (*a*) of this figure shows part of a message signal MS having a discontinuity *d* which in turn gives rise to an image pulse IP, in the manner previously described. The composite line sweep CLS, graph (*b*), consists of a first stepped portion ASP, a second stepped portion BSP and a continuous portion CSP, shown separately in graphs (*e*), (*d*) and (*c*), respectively. It will be noted that all three sweep portions are arrested at their momentary values by the arrival of the image pulse IP. If eight steps are used for each sweep portion ASP and BSP (only four such steps being shown in the drawing), then not more than eight distinguishable values of the continuous sweep portion CSP will suffice to define 512 different line elements. Three different scanning oscillations will be required in lieu of the single oscillation OS, Fig. 1, to transmit the three sweep components, yet the accuracy requirements are greatly reduced since amplitude variations up to half a step in either direction may be tolerated. It will, of course, be understood that the number of components and the number of steps may be varied at will.

Figure 5:
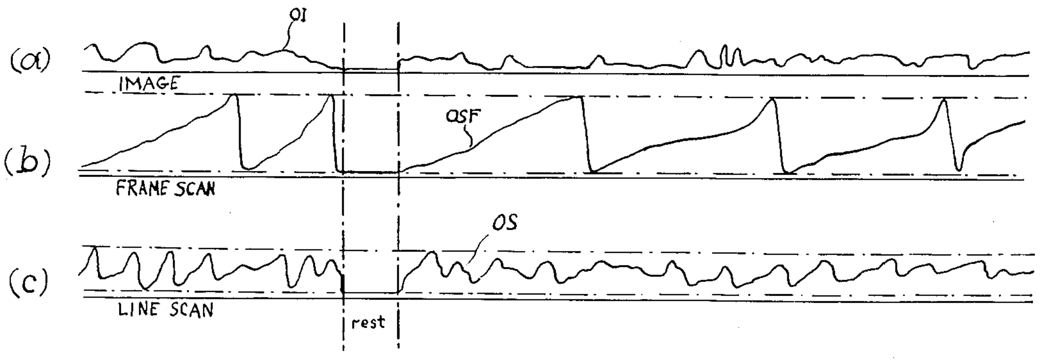
Fig. 5 is a set of graphs illustrating a modified method of frame synchronization.

Fig. 5 illustrates a method of transmission in which both the horizontal and the vertical position of each discontinuity is transmitted, thereby dispensing with the need for a positive line flyback indication. In addition to the modulated carriers having envelopes OI, graph (*a*), and OS, graph (*b*), a third carrier having an envelope OSF, graph (*c*), is transmitted to give the level of the frame scan, or vertical position, of each image pulse. Each scan oscillates between two limits, indicated by horizontal dot-dash lines, which it may reach but never surpass. The last cycle in graph (*b*) depicts a situation in which both the top and the bottom lines of the picture are entirely free of contrasts, the frame scan being thus concentrated in the central portion. It will be understood that even in a frame completely devoid of contrasts there will occur about 500 samplings of the image and of both the horizontal and the vertical sweep, inasmuch as the basic frame sweep rate is about $\frac{1}{500}$ of the basic line sweep rate, the latter in turn being equal to substantially one line scan per half-cycle of the pilot wave PW as will be recalled from graph (*d*) of Fig. 1.

Fig. 5 is also representative of a system using concurrent decoding and translation, hence no rest period of fixed minimum duration need be provided to accommodate the reproducer sweep. In the case of short frames, however, it will be desirable to insert a compensating rest period, as indicated between vertical dot-dash lines, in order to prevent an increase in the apparent brightness of the recorded picture due to a more rapid succession of the frames. It will also be advantageous, here as in the system of Fig. 3, to shorten excessively long frames by suppressing some of the detail, i. e. by making the system non-responsive to minor discontinuities such as, for example, $d_1$ in graph (*a*) of Fig. 1. This can conveniently be accomplished under the control of an auxiliary sweep such as the sweep FCS which on failing to reach its sweep limit CSL, as shown on the left in graph (*b*) of Fig. 3, decreases the sensitivity of the coder.

Apparatus for utilizing the method described for the transmission and reproduction of television messages will be described hereinafter in connection with the remaining figures. It should be understood, however, that the method of the invention is not limited to the operation of such apparatus, or its equivalent, but that it may be used quite independently of any transmission system for, say, the recording of a two-dimensional message on a film, magnetic tape or other storage medium in coded form. Thus either the code pulses IP, SP, or the oscillations OI, OS together with a time signal such as the wave PW′ (or a train of pulses derived therefrom), may be so recorded for subsequent decoding and reproduction of the message; the line flyback signals, when used, will serve as a record from which a line count may be derived to supplement the information obtained from the scanning pulses (or scanning wave) in regard to the location of any recorded change in image intensity, as will be clear from the foregoing.

Accordingly, there has been broadly disclosed a method of coding a message, composed of markings representative of different signal levels, by linearly scanning the message to determine its intensity or level at successive points, determining the location of any change in intensity (at least if said change exceeds a certain threshold value), and also determining the magnitude of the intensity adjacent the point of change. If the message is not obliterated by the scanning, then it is equally feasible to ascertain and to register the magnitude of its intensity just ahead or just back of the point of change, either information being sufficient for a subsequent reconstruction of the message.

Figure 6:
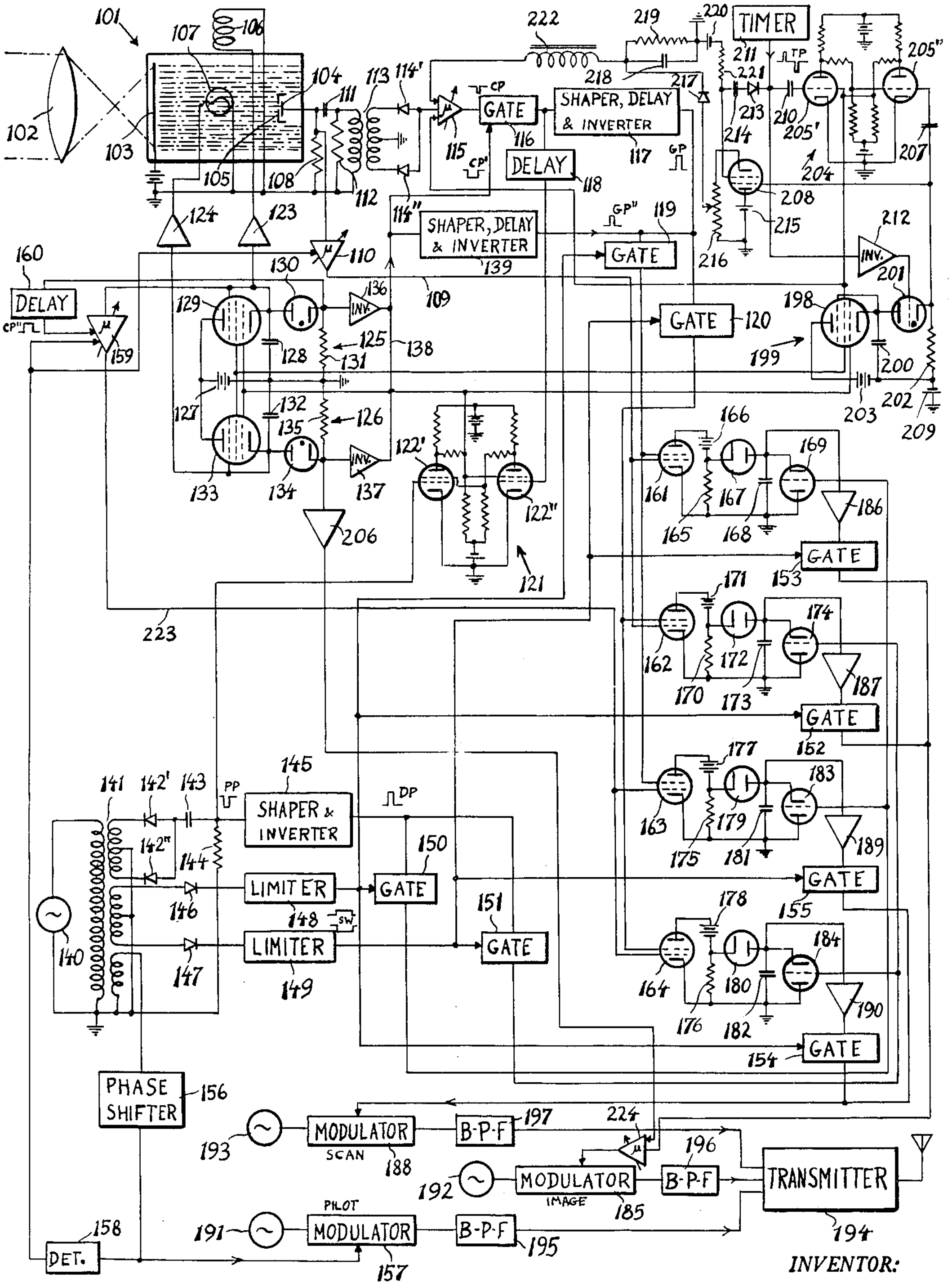
Fig. 6 is a circuit diagram of a transmitting station in a system according to the invention.
Figures 7, 8, 9, 10:
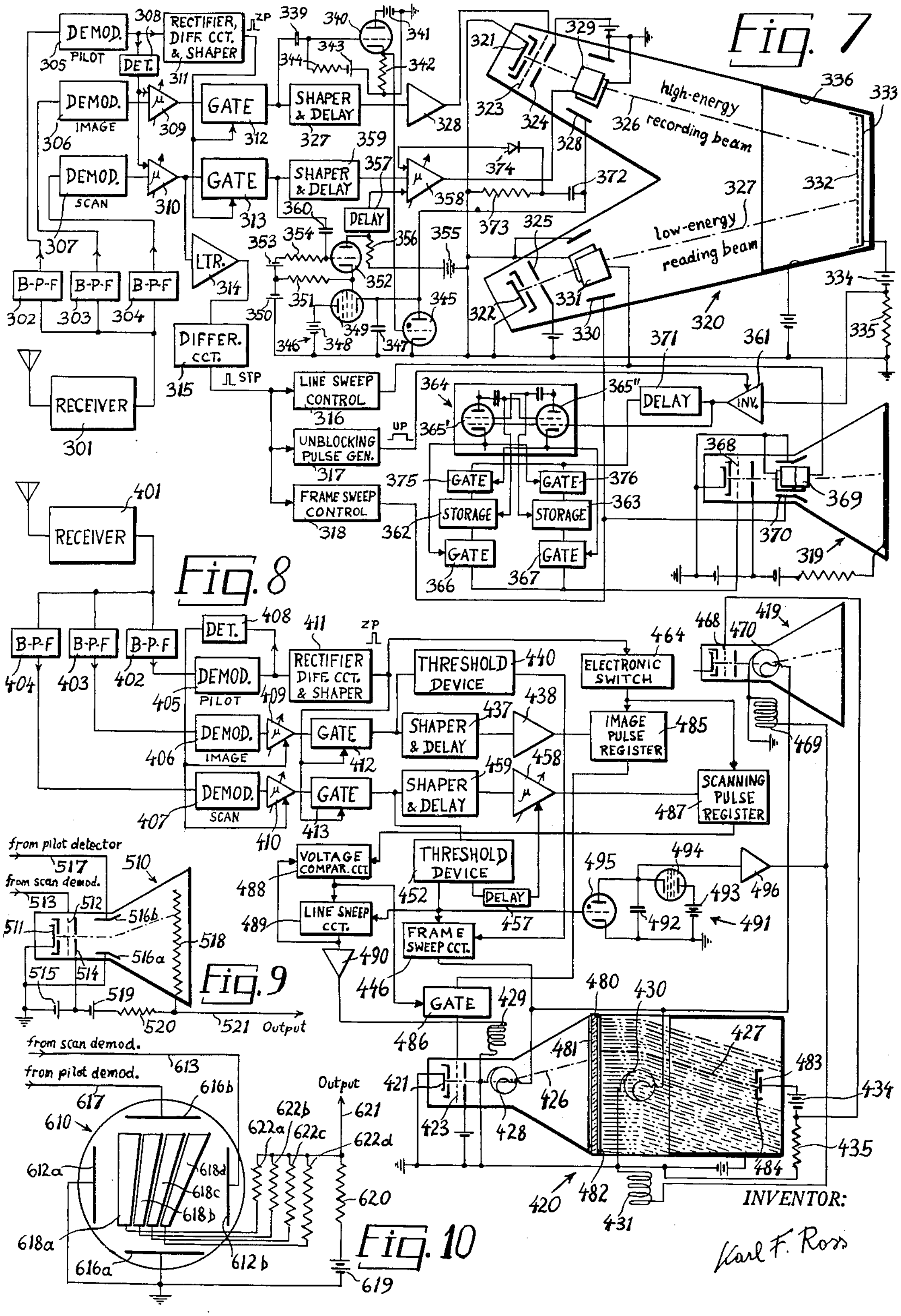
Fig. 7 is a circuit diagram of a receiving station in a system according to the invention.
Fig. 8 is a circuit diagram of a modified form of receiving station.
Fig. 9 is a detail view of a circuit element adapted to be used in the arrangement of Figs. 7 and 8.
Fig. 10 is a detail view of a similar circuit element adapted for a system using the modified sweep of Fig. 4.

In Figs. 6, 7 and 8 various leads terminating in arrowheads represent auxiliary paths for signals controlling the conductivity or activity of the circuits denoted by the boxes (or triangles) touched by the arrows; main signal paths have no arrowheads, except possible at intermediate paths have no arrowheads, except possibly at intermediate points to indicate direction of signal flow. No arrowheads are used where the flow direction or the auxiliary character of the signal is apparent from the nature of the element connected to the lead, as where the latter terminates at the grid of an electron tube.

In Fig. 6 there is shown a transmitting station comprising a conventional television pick-up camera tube 101 of the image dissector type. Light rays from a scene or object to be televised are projected by an optical system, here indicated schematically as a lens 102, upon a photocathode 103 from which an electron bundle modulated in accordance with the intensity of the rays is emitted toward an anode 104 located behind a scanning orifice 105. Horizontal and vertical scanning movement is imparted to the electron bundle by line and frame scanning means here shown as a coil 106 and a coil 107, respectively.

The output of the tube 101 is developed across a resistor 108 connected to the anode 104, said anode being also connected to a lead 109 having a variable-gain amplifier 110 inserted therein. Connected across the resistor 108 is a differentiation circuit comprising a condenser 111 and a resistor 112, followed by a full-wave rectifier circuit comprising a transformer 113 and rectifier elements 114′, 114″. The output of this circuit, which corresponds to the negative pulses CP in graph (*b*) of Fig. 1, passes through a variable-gain amplifier 115 and a gate circuit 116 to a shaper, delay and inverter circuit 117 and in parallel therewith to a delay circuit 118. From the circuit 117 the inverted and delayed pulses GP are applied in parallel to two gate circuits 119 and 120. From the circuit 118 the delayed pulses CP, still of negative polarity, are applied to the right-hand input of an electronic switch 121 shown here as a multivibrator with bilateral stability, i. e. with two tubes 122′, 122″ so interconnected that whichever tube happens to be conductive will remain in this condition until the equilibrium is disturbed by a switch-over pulse externally applied; the lead from delay circuit 118 terminates at one of the grids of right-hand tube 122″ of the multivibrator.

The scanning coils 106 and 107 are energized by way of amplifiers 123 and 124, respectively, from two sawtooth wave generators 125, 126 connected across a common voltage source 127. Generator 125 comprises a condenser 128 connected to amplifier 123 and adapted to be charged from source 127 by way of constant-current pentode 129, a gas-filled diode 130 serving to discharge the condenser through a resistance 131. Generator 126 similarly comprises a condenser 132 connected to amplifier 124, a pentode 133, a gas-filled diode 134 and a discharge resistance 135. The junction of resistances 131 and 135 is grounded and returned to the negative terminal of battery 127; the other ends of these resistances are connected, by way of respective amplifier-inverters 136 and 137, to a lead 138 which terminates at a control electrode of gate circuit 116 and is also connected, via a shaper, delay and inverter circuit 139, to the main inputs of gates 119 and 120.

An oscillator 140, tuned to the frequency of the pilot wave PW in graph (*k*) of Fig. 1, works into a transformer 141 having a single primary and three secondary windings. The upper secondary forms part of a full-wave rectifier and differentiation circuit including two rectifier elements 142′, 142″, a condenser 143 and a resistor 144. Connected to the junction point of the condenser and the resistor, across which there are developed the pilot pulses PP, is a grid of left-hand multivibrator tube 122′ as well as a shaper and inverter circuit 145. The middle secondary of transformer 141 works by way of two rectifiers 146, 147 into two limiters 148, 149 from the outputs of which positive unblocking pulses are alternately applied to two groups of gate circuits. Limiter 148 controls the gate 119 as well as gates 150, 152 and 154; limiter 149 controls the gate 120 as well as gates 151, 153 and 155. The lower secondary of transformer 141 transmits the pilot wave PW to a phase shifter 156 to produce the leading wave PW′, the latter being then fed in parallel to a modulator 157 and to a detector 158 from which latter a control potential is applied to a control electrode of amplifier 110 and to a control electrode of another variable-gain amplifier 159. A second control electrode of variable-gain amplifier 159 is connected to the ungrounded terminal of resistor 131 by way of a delay circuit 160.

The gating pulses GP from circuit 117 pass alternately through gate 119 to the grids of tubes 161, 163 and through gate 120 to the grids of tubes 162, 164. Tube 161 forms part of one of the two storage circuits whose operation is symbolized by graph (*g*) of Fig. 1, the circuit further including a load resistor 165 connected between the grounded cathode of tube 161 and the negative terminal of its source of plate current, shown here as a battery 166, a diode rectifier 167 connected across said resistor in series with a condenser 168, and a triode 169 connected in a discharge path across the condenser; its companion circuit includes, besides tube 162, a load resistor 170, a plate battery 171, a diode 172, a condenser 173 and a discharge triode 174. Corresponding elements of the storage circuits associated with tubes 163 and 164 whose operation is symbolized by graph (*i*) of Fig. 1, include, respectively, load resistors 175 and 176, plate batteries 177 and 178, diodes 179 and 180, condensers 181 and 182, and triodes 183 and 184. Discharge pulses DP, as shown in graph (*f*) of Fig. 1, are applied from the circuit 145 through gate 150 to the grids of tubes 169, 183 and through gate 151 to the grids of tubes 174, 184 A control grid of each tube 161, 162 is connected over lead 119 to the output of amplifier 110, a control grid of each tube 163, 164 being similarly connected over lead 223 to the output of amplifier 159.

The potentials corresponding to the charges IC on condensers 168 and 173 are applied to a modulator 185 alternately through an amplifier 186 and gate 153 and through an amplifier 187 and gate 152, by way of a further amplifier 224 of the variable-gain type. The potentials corresponding to the charges SC on condensers 183 and 184 are applied to a modulator 188 alternately through an amplifier 189 and gate 155 and through an amplifier 190 and gate 154. Sources of carrier wave 191, 192 and 193 are connected, respectively, to modulators 157, 185 and 188, these modulators in turn feeding their outputs to a transmitter 194 by way of respective band pass filters 195, 196 and 197. The filter 195 is representative of any circuit adapted to transmit a small number of frequencies from which the wave PW′ can be reproduced, e. g. an arrangement for transmitting only the frequencies F and F+*f* wherein F is the carrier frequency and *f* the frequency of the pilot wave; the pass bands of filters 196 and 197 are selected narrow enough to produce the rounded envelopes OI and OS shown in graphs (*h*) and (*j*) of Fig. 1, this arrangement being equivalent to the provision of low-pass filters ahead of the modulators 185, 188.

A control electrode of amplifier 224 is connected to the ungrounded terminal of resistor 135 by way of an amplifier 206. A control electrode of amplifier 115 is connected to the screen grid of a pentode 198 forming part of a sawtooth wave generator 199, as well as to the screen grids of the pentodes 129 and 133. Generator 199, which is similar to generators 125 and 126, comprises besides tube 198 a condenser 200, a gas-filled triode 201 and a discharge resistance 202, was well as a source of charging current shown as a battery 203. The interconnected screen grids of the three pentodes are further connected to an output terminal of an electronic switch 204 which is similar to switch 121 and comprises two multivibrator tubes 205′ and 205″, the arrangement being such that these screen grids go more positive when left-hand tube 205′ conducts. The control grids of the pentodes 129, 133 and 198 are likewise interconnected and are further connected to an output terminal of switch 121 in such manner that conduction of right-hand multivibrator tube 122″ will drive these control grids more positive; they are also connected to the conductor 138.

One of the inputs of switch 204, represented by the control grid of tube 205″, is connected by way of a condenser 207 to the cathode of triode 201 and in parallel therewith to a grid of an amplifier tube 208, negative bias for said grid being obtained from a battery 209 connected between resistor 202 and ground. The other input of switch 204, represented by the control grid of tube 205′, is connected via a condenser 210 to a timer 211 producing the pulses TP shown in graph (*a*) of Fig. 3. These pulses are also applied to the grid of triode 201 through an inverter 212 and to another grid of tube 208 through a rectifier 213 and a condenser 214, the rectifier substantially blocking the positive timer pulses TP′ while passing the negative pulses TP″. The anode-cathode circuit of tube 208 includes a battery 215 and a potentiometer 216 whose slider is connected over a rectifier 217 to an integrating circuit comprising a condenser 218 and a resistor 219. The second grid of tube 208 is biased negatively by a battery 220 connected between ground and condenser 214 in series with a resistor 221. The high-voltage terminal of the integrating circuit 218, 219 is connected to a control electrode of amplifier 115 by way of a choke coil 222.

The system shown in Fig. 6 is primarily designed to operate with alternating transmission periods and rest periods, as illustrated in Fig. 3, although being readily adaptable for operation without regularly recurring rest periods in the manner discussed in connection with Fig. 5. Its operation, starting from a rest condition, is as follows:

Shortly before the generation of a positive pulse by timer 211 the condenser 200 of sawtooth generator 199 will have been discharged; tube 205″ of switch 204 will be conductive, having been placed in this condition by a positive pulse developed across resistor 202 during the discharge of condenser 200; and tube 122″ of switch 121 will have been energized by the application of negative pulses PP from circuit 143, 144 to one of the grids of tube 122′. The flow of charging current through pentodes 129, 133 and 198 will be blocked by negative potential on the screen grids of these tubes, applied thereto by switch 204.

Generally, some charge will be present on the condensers 128 and 132 of generators 125 and 126. The resulting voltages are applied to amplifiers 123 and 124 to produce steady magnetizing currents for coils 106 and 107, respectively, thus maintaining the electron bundle in tube 101 in a fixed scanning position; an output current passes through resistor 108, its magnitude being subject to variations only as the result of movement, if any, of the object to be televised. No significant changes will be worked by any voltage pulses derived from such variations inasmuch as amplifier 115 in the path of these pulses is blocked along with the pentodes 129, 133 and 198 by the relatively negative control voltage from switch 204.

The potential of collector electrode 104 is applied to amplifier 110 which over lead 119 controls the bias on the lower grids of tubes 161 and 162; the potential of condenser 128 is applied to amplifier 159 which over lead 223 controls the bias on the lower grids of tubes 163 and 164. The switching wave SW, produced with inverted polarity by limiters 148 and 149, alternately unblocks the gates 150 and 151, thereby enabling the discharge pulses DP from circuit 145 to reach the grids of triodes 169, 174, 183 and 184 so as to remove any charge present on the associated condensers 168, 172, 181 and 182. With the alternate unblocking of gates 153, 155 and 152, 154 a very low voltage will thus be applied to the control electrodes of modulators 185 and 188, thereby reducing the outputs of these modulators to zero or some other minimum amplitude.

The arrival of a positive timer pulse switches the multivibrator 204 to its other conductive condition, thereby removing the blocking potential from the modulator 188 and from the screen grids of pentodes 129, 133 and 198. The application of the same pulse to the grid of tube 201 after inversion in the device 212 will be without effect. Charging current will flow through the pentodes into condensers 128, 132 and 200, the change in potential of the first two condensers causing scanning displacement to be imparted to the electron bundle in tube 101. Assume that the event to happen next is a change in the potential of collector electrode 104 sufficient to give rise to a control pulse CP. This pulse, after a delay in circuit 118, reverses the conductivity of switch 121, thereby applying a negative bias to the control grids of the three pentodes so as to prevent further charging of the associated condensers. If the limiter with the more positive output happens to be limiter 148, gates 119, 150, 152 and 154 will be unblocked and a gating pulse GP will be applied by circuit 117 through gate 119 to the upper grids of tubes 161 and 163, thereby enabling the cathodes of diodes 167 and 179 to assume potentials determined by the potentials of collector 104 and condenser 128, respectively. Condensers 168 and 181 now charge up to the potentials of these cathodes, respectively, but nothing further happens until the arrival of the next pilot pulse PP occurring simultaneously with the reversal of the output voltages of limiters 148 and 149. Pulse PP restores the conductivity of tubes 122″, 129, 133 and 198; the unblocking of gates 153 and 155 causes the carrier waves from generators 192 and 193 to be modulated in accordance with the magnitudes of the charges on condensers 168 and 181, respectively; and the unblocking of gate 151 ineffectively applies the next discharge pulse DP to the grids of triodes 174 and 184 whose condensers 172 and 182 are substantially without charge.

It will be assumed that the next happening is the charging of condenser 128 to a value such as to trigger the gas-filled diode 130 into conductivity, thereby discharging the condenser. A positive voltage pulse is developed across resistor 131 which after delay at circuit 160 is applied as the pulse CP″ to a control electrode of amplifier 159 so as to increase the gain of the latter, as a result of which the residual charge on condenser 128 will bias the grids of tubes 163 and 164 to a value more positive than any attainable in the normal condition of the amplifier. The said positive pulse is inverted by device 136 to produce the negative pulse CP′ on conductor 138 which de-energizes tube 122″ (thereby energizing tube 122′) and blocks the gate 116 so as to prevent passage of any image pulses generated during the flyback stroke of the line sweep; the trailing edge of the same pulse appears, after delay and reinversion at circuit 139, as a positive gating pulse GP″ which is fed through the now open gate 120 to the upper grid of tube 162, thereby enabling the diode 172 to transfer to the previously discharged condenser 173 a charge commensurate with the potential of collector electrode 104 at the beginning of the new line, and to the upper grid of tube 164, thereby charging the condenser 182 to a maximum charge corresponding to the high positive potential on the lower grid of tube 164. When the next pilot pulse PP is produced and the output voltages of limiters 148 and 149 are again reversed, the unblocking of gates 152 and 154 causes the modulators 185 and 188 to be controlled in accordance with the magnitudes of the charges on condensers 172 and 182, respectively, while the unblocking of gate 151 allows pulse DP to effect the discharge of condensers 168 and 181 in preparation for the next cycle.

When the breakdown voltage of diode 134 is reached, condenser 132 is discharged through this tube and a positive voltage pulse is developed across resistor 135 which is inverted by the device 137 to block the gate 116 for the duration of the discharge; from the trailing edge of the inverted pulse there is again derived by the shaper 139 a delayed gating pulse similar to pulse GP″ which causes the magnitude of the line scan and image potentials to be registered on the corresponding storage condensers at the beginning of the next frame. The positive pulse appearing at the cathode of tube 134 is also applied via amplifier 206 to a control electrode of amplifier 224 to increase the gain of the latter to such an extent that the output of modulator 185 will reach an extraordinarily high amplitude, even if the potential of condenser 168 or 173 (depending on which of the two gates 152, 153 is conducting) is at its minimum.

The transmission interval is terminated by the control sweep generator 199 through the discharge of its condenser 200. This is brought about by the ionization of tube 201 either by the application of a positive pulse to its grid or by the charging of condenser 200 to a potential sufficiently high to break down the tube even with normal grid bias. The first case occurs when scanning is slow; a negative pulse from timer 211 is then applied to the grid of tube 201 after inversion in the device 212. The second case occurs with rapid scanning, the condenser being then discharged before the arrival of the negative timer pulse TP″. The discharge current through resistor 202 produces a positive pulse which energizes multivibrator tube 205″ (thereby extinguishing tube 205′) and is also applied to the lower grid of tube 209, thereby causing the latter to conduct unless a negative bias is applied to its upper grid by the simultaneous arrival of the negative timer pulse over rectifier 213 and condenser 214. As long as scanning is rapid, therefore, a positive voltage pulse will appear at the slider of potentiometer 216 at the end of each transmission interval, the voltage pulses passing through rectifier 217 and being integrated by the circuit 218, 219. A voltage corresponding to the integrated pulses is applied by the choke 222 to a control electrode of variable-gain amplifier 115, thereby maintaining a high sensitivity of the coding circuit connected across resistor 108 as long as the pulses follow each other at frequent intervals. If, however, the scanning rate is reduced by the presence of numerous details in the image, thereby causing the timer pulses TP″ to control the termination of the transmission interval as illustrated on the left in graph (*b*) of Fig. 3, then the potential stored on condenser 218 decreases and the gain of amplifier 115 is reduced; this operation raises the threshold amplitude of pulses CP below which no gating pulses GP are generated by the circuit 117, whereby minor variations in image intensity will pass unregistered and the number of interruptions per frame scan will diminish. Sensitivity of the coding circuit may also be controlled manually by displacing the slider of potentiometer 216, or by so readjusting the optical system 102 that only part of the picture will be in sharp focus.

It is desirable to utilize the amplitude of the transmitted pilot wave PW′ as a gauge from which the normal amplitude ranges of the image and scanning waves can be ascertained for a positive determination of the line and frame flyback signals. For this purpose the phase shifter 156 also works into the detector 158 the output of which controls the conductivity of amplifiers 110 and 159, whereby fortuitous variations in the amplitude of the pilot wave will correspondingly modify the amplitudes of the other two waves.

It will be apparent that the system of Fig. 6 may be readily modified to operate in the manner illustrated in graph (*c*) of Fig. 5, by simply changing the operating cycle of the timer 211 to reduce the spacing between each negative pulse TP″ and the subsequent positive pulse TP′ to almost zero. A rest period as shown in Fig. 5 will then occur only if the condenser 200 is fully charged before the timer emits its pulse TP″, e. g. if the charging curve of generator 199 is similar to that shown on the right in graph (*b*) of Fig. 3; in the latter case the duration of the rest period will be substantially equal to the difference between the rest periods shown in the right-hand portion and in the left-hand portion of graph (*d*) of Fig. 3. It will also be understood that a frame scan as shown in graph (*b*) of Fig. 5 may be produced by applying the output of generator 126 to a modulator similar to modulator 188 in a manner equivalent to that shown for generator 125.

The receiving station of Fig. 7 comprises a receiver proper, shown at 301, which works into three band pass filters 302, 303, 304 corresponding, respectively, to the filters 195, 196 and 197 of Fig. 6. The filters feed pilot wave demodulator 305, image wave demodulator 306 and scan wave demodulator 307, respectively. The output of demodulator 305 is delivered to a detector 308 controlling the operation of two variable-gain amplifiers 309, 310, connected, respectively, in the output circuits of demodulators 306 and 307, and in parallel therewith to a rectifier, differentiation circuit and shaper 311 from which pulses ZP are applied to control electrodes of two gate circuits 312, 313 which follow the amplifiers 309 and 310, respectively. Amplifier 310 also works into a limiter 314 and through it into a differentiation circuit 315 from which starting pulses STP are supplied in parallel to a conventional line sweep control circuit 316, to a generator 317 producing the unblocking pulses UP, and to a frame sweep control circuit 318 whose sweep RS has been shown in graph (*h*) of Fig. 3.

The decoding network comprising the circuits 311—313 controls a conventional receiving tube 319 through the intermediary of a translation device 320. This device is a cathode ray tube with two electron guns 321 and 322, an intensity control electrode or grid 323 associated with electron gun 321, accelerating anodes 324, 325 respectively associated with these electron guns so as to produce a high-energy beam 326, emanating from gun 321, and a low-energy beam 327, emanating from gun 322, two pairs of deflecting plates for beam 326 including the ungrounded vertical plate 328 and the ungrounded horizontal plate 329, two pairs of deflecting plates for beam 327 including the ungrounded vertical plate 330 and the ungrounded horizontal plate 351 (all the other deflecting plates being grounded), a mosaic-type target electrode 332 adapted to acquire a charge pattern by secondary electron emission on being struck by the high-energy recording beam and to be discharged by the capture of low-speed primary electrons on being struck by the low-energy reading beam, a conductive backing 333 spaced from the mosaic 332 and connected to ground by way of battery 334 and output resistor 335, and a positively biased coating 336 to absorb stray and secondary electrons.

The pulses passing through gate 312 are applied to grid 323 by way of a shaper and delay circuit 337 and an amplifier 338, and in parallel therewith through condenser 339 to the grid of a tube 340 having a plate battery 341 and a cathode resistor 342. The grid of tube 340 is so biased, by means of a battery 343 connected to it through a resistor 344, that only a highly positive pulse from circuit 312 will cause an output voltage to appear across the resistor 342. The cathode of tube 340 is connected to the grid of a gas-filled triode 345 which forms part of a sweep circuit 346, similar to the circuits 125, 126 and 199 of Fig. 6; this circuit further includes a storage condenser 347 connected across the main electrodes of tube 345 and chargeable from a battery 348 through a pentode 349. The control grid of this pentode is negatively biased from a battery 350 through a resistor 351 and is also connected to the cathode of a triode 352 whose control grid, in turn, is negatively biased from a battery 353 by way of a resistor 354; plate current is supplied to tube 352 from a battery 355 through a resistor 356. The plate of tube 352 is connected over a delay circuit 357 to a control electrode of a variable-gain amplifier 358 through which pulses from gate 313, having passed through a shaper and delay circuit 359, are applied to the horizontal deflecting electrode 329; the output of circuit 313 is also connected, by way of a condenser 360, to the grid of triode 352. Bridged across condenser 347 is the series combination of a condenser 372 and a resistor 373, their junction point being connected to another control electrode of amplifier 358 by way of a rectifier 374.

The ungrounded terminal of output resistor 335 is connected to the input of an inverter and gate circuit 361 whose output is connected through a delay circuit 371 and respective gate circuits 375, 376 to the main input terminals of two storage circuits 362, 363 each similar to the four storage circuits, such as 161, 165—169, of Fig. 6, and directly to the input of an electronic switch 364. This switch is of the flip-flop type, i. e. it alternates between two switching conditions in response to signals applied successively to the same input terminal, said terminal being represented by the interconnected lower grids of two multivibrator tubes 365′, 365″ having connections (not further illustrated) similar to those of switch 121 in Fig. 6; in addition each tube has its upper grid reactively connected, as shown, to the plate of the other tube so that the positive pulse applied by the inverter 361 to the lower grid of the momentarily conducting tube will be overridden by a negative pulse simultaneously applied to the upper grid thereof from the plate of the other tube which is being rendered conducting by the same positive pulse. The upper grids of tubes 365″ and 365′ are, furthermore, connected to a control electrode of circuits 362 and 363, respectively, whereby a positive discharge pulse may be applied to either circuit. Switch 364 has two additional output terminals, represented by the cathodes of its tubes 365′ and 365″, one terminal being connected to a control electrode of gate circuit 376 and to a control electrode of a gate circuit 366 coupled to the output of storage circuit 362, the other terminal being connected to a control electrode of gate circuit 375 and to a control electrode of a gate circuit 367 coupled to the output of storage circuit 363. The outputs of the gate circuits 366 and 367 are multipled to the intensity control electrode 368 of receiving tube 319. Line sweep control circuit 316 supplies sawtooth waves to horizontal deflecting electrode 331 of device 320 and to a corresponding electrode 369 of tube 319; frame sweep control circuit 318 supplies sawtooth waves to vertical deflecting electrode 330 of device 320 and to a corresponding electrode 370 of tube 319. Unblocking pulses UP are periodically delivered by the generator 317 to a control electrode of gate circuit 361.

In the operation of the arrangement of Fig. 7 the output of demodulator 305 is received by the detector 308 to control the gain of amplifiers 309 and 310 in accordance with the amplitude of the incoming pilot wave PW′. This wave is also fed to the circuit 311 which generates a pulse ZP whenever the wave goes through zero. The pulses ZP momentarily unblock the gates 312 and 313 to produce the pulses IP and SP, respectively, shown in graphs (*a*) and (*b*) of Fig. 2. The latter pulses, after a short delay, are applied to the grid 323 and to the deflecting electrode 329, respectively, to control the beam 326 in such manner as to produce a pattern of charges on target electrode 332 corresponding to these pulses; thus every image pulse IP triggers the beam 326, in a position determined by the corresponding scanning pulse SP, to produce on a selected mosaic element a positive charge of a magnitude dependent on the amplitude of the pulse IP. Charging current flows through the resistor 335, yet the resulting voltage impulses will be without effect upon the storage circuits 362, 363 since the gate 361 is blocked in the absence of a pulse UP from circuit 317. As the beam 326 is thus advanced under the control of pulses SP, its overall displacement is generally in step with that of the electron bundle of tube 101 at the transmitter, even though precise synchronism is absent.

The bias on the grid of tube 352 is such that only a pulse exceeding the line scanning limit LSL, such as pulse $SP_x'$ of graph (*b*) in Fig. 2, will render this tube conductive, thereby in turn unblocking the pentode 349 sufficiently to raise the potential of frame sweep condenser 347 by a value corresponding to the advance of one line; the simultaneously generated negative pulse from resistor 356 subsequently decreases the gain of amplifier 358 to reduce the amplitude of the delayed scanning pulse to a minimum as shown at $SP_4'$ in graph (*e*) of Fig. 2. When a flyback pulse FFB, as shown in graph (*e*) of Fig. 3, passes through gate 312, the bias on the grid of tube 340 is overcome and the positive pulse on the cathode of this tube causes the ionization of tube 345, thereby discharging the condenser 347 and returning the beam 326 to the upper limit of its sweep. The negative pulse simultaneously developed across resistor 373 biases amplifier 358 to cutoff, thereby deflecting the beam 326 off the target 332 during the return sweep.

When the transmission period is terminated, the output of scanning demodulator 307 falls to a value less than any attained during signal reception, hence the output of limiter 314 drops below its hitherto steady level. A starting pulse STP is thereupon produced by circuit 315 which triggers the sweep control circuits 316 and 318 and also actuates generator 317 to produce a pulse UP which unblocks the gating device 361. As the beam 327 scans the target 332 in synchronism with the beam of tube 370, pulses commensurate with the magnitude of the previously stored charges are developed across output resistor 335; these pulses are due to a reduction in the number of electrons reaching the collector 333 whenever the beam strikes a previously charged mosaic element and with its primary electrons neutralizes the charge stored on such mosaic element, thereby erasing the pattern previously formed.

Any pulse appearing across resistor 335 reverses the conductive condition of switch 364. Assuming tube 365″ to have been initially conductive, the first pulse to arrive at the lower grids of the multivibrator tubes cuts off this tube and energizes tube 365′, which unblocks gates 366 and 376, blocks gates 367 and 375, and applies a short positive pulse from the plate of tube 365″ to storage circuit 363 to discharge the latter just before the arrival of the delayed pulse from inverter 361 through the gate 376. The next pulse generated in the output of device 320 restores the conductivity of tube 365″, de-energizes tube 365′, unblocks gates 367 and 375, blocks gates 366 and 376, and momentarily discharges circuit 362 preparatory to being admitted to the main input of said circuit by way of gate 375. The alternate unblocking of gates 366 and 367 applies a control voltage to the grid electrode 368 of tube 319, thereby causing its beam to register a reproduction of the original signal on the fluorescent screen of that tube.

The arrangement of Fig. 8 includes many elements corresponding to elements of Fig. 7 and designated by similar reference numerals, with the "3" in the hundreds digit replaced by a "4." Thus the receiving station of Fig. 8 comprises a receiver proper, designated 401, three band pass filters 402, 403, 404, three demodulators 405, 406, 407, a detector 408 controlling the gain of amplifiers 409 and 410, a rectifier, differentiation circuit and shaper 411 as well as gates 412, 413, all connected in the manner described for the corresponding elements of Fig. 7. Other elements of Fig. 8 having counterparts in Fig. 7 are threshold devices 440 and 452 (corresponding, respectively, to tubes 340 and 352 together with their associated circuits), shaper and delay circuits 437 and 459, a frame sweep circuit 446, amplifier 438 and 458, an electronic switch 464 and a relay circuit 457.

The translator 320 of Fig. 7 has been replaced in Fig. 8 by a translator 420 comprising a tube divided into two sections by a transverse partition 480 of transparent insulating material. The left-hand side of this partition bears a fluorescent coating 481 upon which impinges a recording beam 426 emitted by an electron gun 421; the intensity of beam 426 is controlled by the potential on a grid electrode 423 while its position is determined by the magnetic fields produced by a vertical scanning coil 428 and a horizontal scanning coil 429. Coating 481 has a luminous persistence which is high with respect to the normal line sweep cycle but low with respect to the normal frame sweep cycle, whereby any light pattern produced by the beam 426 will remain substantially unchanged for a few line sweeps but will have completely disappeared at the end of an entire frame sweep.

The right-hand side of partition 480 bears an electron-emissive photosensitive coating 482, thus representing a photocathode from which an electron image corresponding to the luminous pattern on screen 481 is emitted toward a collector electrode 483 positioned behind an apertured shield 484. A vertical scanning coil 430, coupled to coil 428, controls the direction of flow of the electrons in such manner that the bundle of electrons focused at any time upon the collector 483, and designated 427 in conformity with the reading beam 327 of Fig. 7, originates at a location on partition 480 just above the locus of impingement of the beam 426 upon said partition. Horizontal movement of the electrons in the right-hand section of tube 420 is controlled by a coil 431 coupled to a similar coil 469 which imparts line scanning movement to the beam of a receiving tube 419. The latter tube also comprises a vertical scanning coil 470 coupled to the corresponding coils 428 and 430 of tube 420. Collector electrode 483 is connected to ground through a battery 434 in series with a resistor 435, the ungrounded terminal of said resistor being connected to an intensity control electrode 468 of tube 419.

The pulses derived from amplifier 438 are applied to an image pulse register 485 which is similar to the register 362, 363, 367, 375, 376 of Fig. 7 and is controlled in like manner from the associated electronic switch 464; the output of register 485 is applied to intensity control electrode 423 by way of a gate circuit 486. The pulses derived from amplifier 358 are applied to a scanning pulse register 487 which is similar to the register 485, its output being fed to one input electrode of a voltage comparison circuit 488 of a type well known per se, e. g. as used in connection with line finders and selectors of automatic telephone exchanges. Another input electrode of circuit 488 is connected to an output terminal of a line sweep circuit 489 which is similar to circuit 125 of Fig. 6 and which energizes coil 429 through an amplifier 490 in substantially the same manner as that in which coil 106 is energized from circuit 125 through amplifier 123. One input electrode of sweep circuit 489, corresponding to one of the grids of tube 129 in Fig. 6, is connected to the output of circuit 411 while a second input electrode, corresponding to another of said grids, is connected to the output of comparison circuit 488. Threshold device 452, in addition to controlling the operation of frame sweep circuit 446, also controls a line sweep circuit 491 comprising a condenser 492, a battery 493 from which the condenser can be charged through a pentode 494, and a gas-filled triode 495 having its control grid connected to the output of device 452; a corresponding control electrode of circuit 489 is similarly controlled from said device. The potential on condenser 492 is applied to an amplifier 496 which energizes coils 431 and 469; coils 428, 430 and 470 are energized from the frame sweep circuit 446. The operation of the arrangement of Fig. 8, to the extent that it deviates from that of the preceding embodiment, is as follows:

Zero-signal pulses ZP from circuit 411 periodically actuate the switch 464 to control the operation of register 485 so that the image pulses received from amplifier 438 will be stored therein and will result in an output having the form of a stepped wave as shown in graph (*f*) of Fig. 2. At the same time the scanning pulses received from amplifier 458 will be stored in register 487 to give rise to a similarly stepped wave. As long as the output voltage of line sweep circuit 489, applied to one input of comparison circuit 488, is below that applied to the other input of said comparison circuit from the register 487, the comparison circuit will maintain sweep circuit 489 operative to cause its output voltage to rise as shown by the inclined portions of the wave LS in graph (*e*) of Fig. 2; at the same time the gate 486 will be held open as indicated by the solid portions of the stepped wave in graph (*f*) of the same figure. The luminous pattern thereby registered on the screen 481 will be a continuous line signal of the type shown in graph (*g*) of Fig. 2, in contradistinction to the charge pattern of Fig. 7 in which the space signal registered on target 332 consisted of isolated pulses.

Inasmuch as the vertical sweep in the right-hand section of translator 420 lags only by, say, one or two lines behind the vertical sweep of the left-hand section, an electron image of any such line will, shortly after its registration, appear in the proper elevation to be moved past the collector anodes 483. Thus when the threshold device 452 responds to a line flyback pulse LFB, e. g. as shown in graph (*d*) of Fig. 3, tube 495 will be ionized to discharge the condenser 492 whereupon battery 493 recharges the condenser, through pentode 494, at a rate similar to the basic scanning rate of the sweep LS in graph (*d*) of Fig. 1. At the same time the device 452 re-starts the line sweep circuit 489 and also advances the frame sweep of circuit 446 to cause the next scanning in both sections of the tube 420 to take place one line below the one previously scanned. The output of collector 483, developed across resistor 435, is fed to the grid 468 of tube 419 whose beam, being displaced in synchronism with the electron stream in the right-hand section of tube 429, reproduces each line on the associated screen as fast as it is read by the collector.

Because the line images registered on the screen 481 of tube 420 will be substantially identical with those appearing on the screen of tube 419, a usable picture may also be obtained directly by omitting the right-hand section of this tube, together with tube 419, and exposing the partition 480 to view. The more elaborate circuit arrangement of Fig. 8 has, however, the advantage that a relatively small translator tube 420 may be used in conjunction with a conventional picture tube 419 of large screen size. The system may furthermore be used where it is desired to retransmit a program, received at a relay station (tube 420) via long-distance, low-frequency transmission according to the present invention, to a number of conventional local receiving stations (tube 419) in the usual manner. Also, the system of Fig. 8 illustrates the manner in which a system of the type shown in Fig. 7 the electronic charge pattern stored on target 332 may be replaced by a luminous pattern on screen 481, with the lower half of translator 320 and the associated reproducer 319 replaced by the right-hand section of tube 420 and reproducer 419. Thus it will be readily understood that the arrangement of Fig. 8 may be made to function in a manner equivalent to that described for the arrangement of Fig. 7 by omitting register 487, comparison circuit 488 and sweep circuit 489, energizing the horizontal scanning coil 429 directly from amplifier 458, applying the image pulses from amplifier 438 directly to grid 423 and feeding the output signal developed across resistor 435 to the image register 485 in order to produce a continuous wave to bias the grid 468, all in strict analogy with the showing of Fig. 7. It will, on the other hand, also be appreciated that the system of Fig. 7 may be used for concurrent decoding and translating, as previously set forth, by having the reading beam 327 follow the recording beam 326 with a lag of a few lines only through an arrangement analogous to that shown in Fig. 8 for the control of the electron stream in the right-hand section of tube 420. Likewise, lengthening of the afterglow period of coating 481 may enable the system of Fig. 8 to be used for consecutive decoding and translating, i. e. for the translating of an entire frame (or major portions thereof) during a rest period provided for that purpose. Two or more tubes of the type shown at 420 may, of course, be used alternately or cyclically to afford each tube a longer interval during which its light pattern may fade away.

Fig. 9 shows a cathode ray tube 510 adapted to be used as the variable-gain amplifier 310 or 410 of Fig. 7 or 8. This tube comprises an electron gun 511, an intensity control electrode 512 connected to a lead 513 which extends toward the associated scanning demodulator (307 or 407), an accelerating anode 514 deriving positive bias from a battery 515, a grounded vertical deflecting electrode **516*a*, an ungrounded vertical deflecting electrode 516*b* connected to a lead 517 which extends toward the associated pilot wave detector (308 or 408), a target electrode 518 of resistance material having its upper end unconnected and having its lower end connected to the positive terminal of a battery 519 through a resistor 520, and an output lead 521 connected to said lower end of electrode 518. It will be apparent that variations in the detector potential applied over conductor 517 will alter the position of the beam of the tube, thereby affecting the amplitude of an output signal produced in response to a predetermined input signal applied over lead 513**.

The amplifier of Fig. 9 may be modified, as shown in Fig. 10, for the purpose of producing an output varying in steps, rather than continuously, as described in connection with Fig. 4. Fig. 10 shows a cathode ray tube 610 having horizontal deflection electrodes **612*a*, 612*b* taking the place of the intensity control electrode 512 of Fig. 9, vertical deflecting electrodes 616*a*, 616*b*, four target electrodes 618*a*, 618*b*, 618*c* and 618*d* of highly conductive material, a biasing battery 619 for these target electrodes, an output lead 621 connected to the positive pole of battery 619 through an output resistor 620, and four individual resistors 622*a*, 622*b*, 622*c* and 622*d* connecting respective ones of the electrodes 618*a*—618*d* to the lead 621. Deflecting electrodes 612*b* and 616*b* are connected to leads 613 and 617, respectively, the other deflecting electrodes 612*a* and 616*a* being grounded. Resistors 622*a*—622*d*** are of progressively increasing size.

As long as a steady potential is present on the lead 617, the beam of tube 610 will be horizontally deflected in an invariable vertical position under the control of the output of the associated scan demodulator as applied over lead 613 to electrode **612*b*. It will be seen that the output voltage on conductor 621 will not vary over a range of input voltages causing the beam to impinge anywhere upon a given one of the target electrodes, e. g. on electrode 618*b*, yet that this output voltage will become abruptly more positive as a more positive input voltage causes the beam to strike the next target electrode, e. g. electrode 618*c*. Since the target electrodes 618 widen toward the upper vertical deflecting electrode 616*b*, to which the output of the pilot wave detector (assumed to be a signal of positive polarity) is applied, it will be apparent that any increase in the amplitude of the pilot wave, resulting in a higher potential on lead 617**, will deflect the beam of the tube onto a more elevated level on which greater variations in input voltage are required to pass from one target electrode to the next. In this manner the proper magnitude of the respective sweep voltage component, e. g. the component ASP shown in graph (*e*) of Fig. 4, will always be obtained in the face of substantial fluctuations in signal receiving conditions, even if the amplitude of the outgoing scanning pulses at the transmitter is maintained accurate only within rather wide limits.

It is to be understood that the specific embodiments hereinabove described and illustrated in the drawing are merely representative of a variety of arrangements by which the principles of the present invention may be realized, and that persons skilled in the art will be able to devise numerous equivalent arrangements, modifications and adaptations which, insofar as they are consistent with the language of the appended claims, are intended to be embraced within the scope of the invention.

I claim:

1. The method of coding a linearly scannable message within a limited time, preparatorily to reproduction, which comprises the steps of linearly scanning said message at a rate substantially faster than that required for constant-speed scanning of said message within the time allotted therefor, making a first measurement of the intensity of the message content at a point adjacent any point encountered during scanning at which said intensity changes by at least a predetermined minimum amount, concurrently making a second measurement concerning the location of any such point of change, interrupting the scanning upon encountering any such point, resuming scanning after a time which is short relative to said allotted time but long enough to make successive measurements occur during successive intervals of at least approximately uniform duration, and registering said measurements in the form of first and second code pulses, respectively.

2. The method of scanning a succession of images within a limited time, preparatorily to reproduction, which comprises the steps of scanning each image at a rate which, if uninterrupted, would result in the complete scanning of at least a portion of the image within an interval representing a fraction of the average time allotted for the scanning of such portion, said fraction being the reciprocal of a numerical value at least equal to the anticipated average number of significant changes, defined as changes by at least a predetermined threshold value in the brightness of said image, to be encountered in the scanning of said portion, interrupting said scanning upon encountering any such significant change, measuring the brightness of said image at a point immediately adjacent the point of change, measuring the location of said point of change within said portion, resuming scanning at the same rate at the end of the said interval, thereby initiating a new interval of like duration, proceeding in like manner upon encountering another significant change of brightness during said new interval, continuing in this manner through successive intervals of like duration until scanning of said portion is completed, temporarily storing the resulting measurements, and periodically evaluating, at intervals equal to said scanning intervals, the stored measurements.

3. The method according to claim 2 wherein the brightness is measured at a point immediately following the point of change.

4. The method according to claim 2 comprising the further step of varying the said threshold value for different images, in accordance with the number of contrasts present therein, in a manner tending to maintain the duration of a scanning interval close to constant.

5. The method according to claim 2 wherein said image portion is a scanning line and is subdivided into sections, the measuring of location including identification of the section in which the point of change is located.

6. A television system comprising a transmitting station including a pick-up device, output means in said pick-up device, first scanning means for operatively aligning successive portions of an image to be televised with said output means, said scanning means operating at a speed which is high compared to the speed required for uniform scanning of the entire image during the time alotted therefor, detector means connected to said output means and responsive to substantial changes in the output thereof, pulse generating means controlled by said detector means for producing a train of pulses each representative of the magnitude of said output immediately following a respective one of said substantial changes, pulse spacing means coupled to said detector means for temporarily inactivating said first scanning means under the control of said detector means immediately following any of said substantial changes, synchronizing means coupled to said scanning means for producing a signal upon the reactivation of said scanning means, and transmission means for sending out the said pulses and said signal; a communication channel; and a receiving station connected via said channel to said transmitting station and including receiving means, reproducing means coupled to said receiving means and including second scanning means, sweep means coupled to said receiving means and responsive to said signal for actuating said second scanning means substantially in step with said first scanning means, a pulse-responsive register in said reproducing means adapted to retain between successive pulses a registration of the pulse last applied to it, means for applying said train of pulses to said register, and means including said second scanning means and said register for controlling a source of light in response to said train of pulses so as substantially to duplicate the original image.

7. A television system comprising a transmitting station including a pick-up tube, first scanning means for operatively aligning successive portions of an image to be televised with an element of said pick-up tube, output means actuated by said operatively aligned portions, sweep means applying a control electric variable to said scanning means, detector means connected to said output means and responsive to substantial changes in the output thereof, first pulse generating means controlled by said detector means for producing a train of first pulses each representative of the magnitude of said output immediately following a respective one of said substantial changes, second pulse generating means controlled by said detector means for producing a train of second pulses each representative of the magnitude of said control electric variable immediately following a respective one of said substantial changes, timing means establishing a series of time intervals each at least approximately equal to the time allotted to the scanning of an entire image divided by the expected maximum number of significant contrasts to be encountered during such scanning, said detector means including means for inactivating said sweep means and arresting said scanning means, in response to any of said substantial changes, until the end of the current time interval, and transmission means for sending out the said pulses as well as synchronizing signals controlled by said timing means; a communication channel; and a receiving station connected via said channel to said transmitting station and including receiving means, reproducing means coupled to said receiving means and including second scanning means, sweep control means coupled to said receiving means and responsive to said second train of pulses and to said synchronizing signals for actuating said second scanning means substantially in step with said first scanning means, a pulse-responsive register adapted to retain between successive pulses a registration of the pulse last applied to it, means for applying said first train of pulses from said receiving means to said register, and means including said second scanning means and said register for controlling a luminous spot in response to said trains of first and second pulses so as substantially to duplicate the original image.

8. A television system according to claim 7 wherein said transmitting station includes first and second storage means for temporarily storing said first and second pulses, respectively, and applying the stored pulses at regular intervals to said transmission means.

9. A television system according to claim 8 wherein said transmission means includes harmonics suppression means converting said pulses into amplitude-modulated sine waves of limited band width.

10. A television system according to claim 7 wherein said transmitting station includes means for modifying the operation of said second pulse generating means to produce a special flyback pulse at the end of each scanning line.

11. A television system according to claim 7 wherein said reproducing means includes a cathode ray tube and means under the control of said second scanning means for storing in said tube a temporary record of said first train of pulses.

12. A television system according to claim 11 wherein said transmitting station includes a timer circuit periodically interrupting the generation and the transmission of pulses for rest periods of at least a predetermined minimum duration, said receiving station including translating means operative during said rest periods for deriving a viewable picture from the temporary record stored in said tube.

13. A television system according to claim 12 wherein said transmitting means includes a control circuit interrupting the generation and the transmission of pulses after successive scanning of a number of lines representing in their totality an entire frame, and means for resuming said generation and transmission of pulses under the control of said timer circuit at the end of the rest period immediately following.

14. A television system according to claim 7 including adjusting means for varying the sensitivity of said detector means and measuring means determining the length of time required to scan an entire frame, said measuring means controlling said adjusting means in a sense tending to keep frame scanning time within predetermined limits.

15. A television system according to claim 7 wherein said timing means includes a source of pilot wave, said receiving means deriving from said pilot wave an indication of the normal amplitude range of said pulses, thereby enabling pulses of abnormal amplitude to be used for supervisory purposes.

16. A television system according to claim 11 wherein said receiving station includes a viewing tube having a beam, deflecting means for said beam and intensity control means for said beam, said reproducing tube means being provided with translating means having a reading agent displaced by said deflecting means in synchronism with said beam and deriving an output from said temporary record stored in said tube, and means for applying said output to said intensity control means for causing said beam substantially to reproduce a duplicate of the original image.

17. A system for scanning a linearly scannable message within a given length of time, preparatorily to reproduction, comprising sweep means for scanning the message at a rate which, if uninterrupted, would result in the complete scanning of at least a portion of the message within an interval representing a fraction of the average time allotted for the scanning of such portion, output means controlled by said sweep means and responsive to the intensity of the message content at a point being scanned, sweep arresting means responsive to said output means and connected to said sweep means for interrupting the operation of the latter upon encountering any significant change, defined as a change by at least a predetermined threshold value, in the intensity of said message content, timer means effective at the end of each said scanning interval for reactivating said sweep means if inactivated by said sweep arresting means, storage means controlled by said output means for registering the message intensity adjacent any point of significant change, control means connected to said sweep means for so regulating the scanning rate as to maintain the ratio between said average allotted time and said scanning interval at least equal to the anticipated average number of significant changes in each message portion to which time has been so allotted, and means coupled to said sweep means for registering the location of each point of significant change on said storage means.

18. A system according to claim 17, further comprising adjustable discriminator means in said output means adapted to vary said threshold value in keeping with the number of intensity variations present in each message to be scanned, said control means maintaining said scanning rate substantially constant.

19. A system according to claim 18 wherein said discriminator means is manually adjustable.

20. A system according to claim 18 wherein said message comprises a succession of television frames, further including counting means controlled by said sweep arresting means for adjusting said discriminator means in accordance with the number of interruptions in the scanning of a preceding frame.

References Cited in the file of this patent

UNITED STATES PATENTS

| | | |
|---|---|---|
| 1,613,686 | Vernam | Jan. 11, 1927 |
| 1,851,072 | Vernam et al. | Mar. 29, 1932 |
| 1,910,586 | Bartholemew et al. | May 23, 1933 |
| 2,115,894 | Watson | May 3, 1938 |
| 2,202,605 | Schroter | May 28, 1940 |
| 2,321,611 | Moynihan | June 15, 1943 |
| 2,437,027 | Homrighous | Mar. 2, 1948 |

FOREIGN PATENTS

| | | |
|---|---|---|
| 909,949 | France | May 22, 1946 |